Patented Aug. 30, 1949

2,480,556

UNITED STATES PATENT OFFICE 2,480,556

BACTERICIDAL COMPOSITIONS

Arthur Henry Craige, Jr., and Albert L. Kleckner, Indianapolis, Ind., assignors to Allied Laboratories, Inc., Kansas City, Mo., a corporation of Delaware No Drawing. Application July 17, 1945,
Serial No. 605,646

7 Claims. (Cl. 167—51.5)

This invention relates to pharmaceutical compositions and more particularly relates to pharmaceutical compositions having bactericidal, bacteriostatic, antiseptic, fungicidal and fungistatic properties and containing as the essential ingredients a sulfonamide and a diphenylmethane wherein each of the phenyl groups of the diphenylmethane has at least one hydroxy and at least one halogen substituent.

One object of this invention is to provide a preparation suitable for the treatment and prevention of a wide variety of infections of man and animals.

Another object of this invention is to provide a preparation comprising a mixture containing as the essential ingredients a sulfonamide, having a bacteriostatic action, and a diphenylmethane, having at least one hydroxy and at least one halogen substituent on each of the phenyl groups, and wherein the mixture has a greater detrimental effect on microorganisms than the sum of the effects of the individual ingredients.

In attaining the objects of the present invention, the sulfonamide and the diphenylmethane compound are incorporated in the same compositions. Suitable compositions may be in the form of dusting powders comprising a mixture of the two essential active ingredients and/or diluted with an inert substance such as talc or starch. Similarly, the dusting powders may contain various other substances that are frequently included in dusting powders as for example, boric acid, zinc stearate, zinc peroxide, antiseptic dyes, wetting agents, local anesthetics, etc. Suitable compositions may likewise be those in which the two essential ingredients are incorporated with solid or semi-solid substances; such as soaps, ointments, vanishing creams and similar compositions for topical use. Other suitable compositions include solutions or suspensions of the two essential ingredients in an aqueous medium or an organic liquid medium.

In a preferred form the sulfonamide and the diphenylmethane compound are mixed and/or suspended in a liquid petrolatum medium.

In the above compositions, the exact quantity or percentage of the individual essential active ingredients will vary somewhat with the form of the composition and the particular use to which the composition is to be put. In the dusting powder compositions wherein the sulfonamide and the diphenylmethane compound are the sole ingredients, the sulfonamide may be varied from about 1 to 99% and the diphenylmethane compound from about 1 to 99%. In most compositions we prefer to employ from about 1 to 25% of the diphenylmethane compound and from about 1 to 40% of the sulfonamide.

The following are representative examples of compositions that have been found to possess the desired bactericidal and bacteriostatic properties and have also been found to be non-objectionable from tissue irritation standpoint.

A composition was prepared by triturating 20 grams of powdered sulfanilamide with 20 grams of 2-2'-dihydroxy-5-5' dichlorodiphenylmethane and enough mineral oil to wet the mixture until a smooth paste was formed after which sufficient mineral oil was added to make 100 cc. The finished preparation was fluid enough to be poured and the powdered ingredients could easily be uniformly dispersed therein by shaking.

Another satisfactory preparation was made by triturating 20 grams of sulfanilamide with mineral oil and 5 grams of 2-2'-dihydroxy-5-5'-dichlorodiphenylmethane with another portion of mineral oil. The two portions were then mixed together and sufficient mineral oil incorporated to make 100 cc. of finished product.

In carrying out the present invention, it is to be understood that any sulfonamide having a bacteriostatic action can be used. Included among such sulfonamides are sulfanilamide, sulfapyridine, sulfathiazole, sulfadiazine and derivatives or variants of the above sulfonamides.

The diphenylmethanes useful in carrying out the present invention can broadly be described as those wherein each of the phenyl groups contain at least one halogen substituent and at least one hydroxy substituent. They can be represented by the following general formula:

in which Y and Y' represent phenyl radicals each having at least one halogen substituent and at least one hydroxy substituent. While we have found that at least one halogen substituent and at least one hydroxy substituent must be present on the phenyl groups, other substituents, i. e., alkyl, may also be present without destroying their applicability.

The preferred diphenylmethanes are those represented by the following general formulae:

(a) 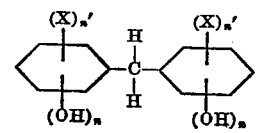

in which X represents a halogen, n represents 1 or 2 and n' represents 1, 2, 3 or 4.

(b) 

in which Z and Z' represent phenyl radicals each having at least one chlorine substituent and at least one hydroxy substituent.

(c) 

in which G and G' represent phenyl radicals each having at least one bromine substituent and at least one hydroxy substituent. Specific compounds falling within the above classes include 2-2'-dihydroxy-5-5' - dichlorodiphenylmethane, 2-2'-dihydroxy - 5-5'-dibromodiphenylmethane, 2-2'-dihydroxy-3-5-3'-5' - tetrachlorodiphenylmethane, 2-2'-dihydroxy-3-5-3'-5' - tetrabromodiphenylmethane, 2-2'-dihydroxy-3-5-6-3'-5'-6'-hexachlorodiphenylmethane, 2-2'-dihydroxy - 3-4-5-6-3'-4'-5'-6'-octachlorodiphenylmethane, 2-2'-dihydroxy-5-5'-dibromo-3-6-3'-6' - tetrachlorodiphenylmethane, 2-2'-dihydroxy-3-5-6-3'-5'-6'-hexabromodiphenylmethane, and their salts including alkali metal, alkaline earth metal, and heavy metal salts.

As previously indicated the phenyl groups may have in addition to the halogen and hydroxy groups on the ring an alkyl group and still be useful in accordance with the invention. Among such alkyl substituted compounds may be included 2-2'-dihydroxy-4-4'-dimethyl-5-5'-dichlorodiphenylmethane, 2-2'-dihydroxy-4-4'-dimethyl-3-5-3'-5'-tetrachlorodiphenylmethane, 2-2'-dihydroxy - 4 - 4' - dimethyl-3-5-6-3'-5'-6'-hexachlorodiphenylmethane and related compounds having the methyl group in some position other than 4 or in more than one position as well as those wherein some or all of the chlorines are replaced by bromine, and those wherein the methyl groups are replaced by a lower alkyl group such as ethyl, propyl, butyl or amyl.

Among those compounds having more than one hydroxy group on the phenyl rings may be included 2-4-2'-4'-tetrahydroxy-5-5'-dichlorodiphenylmethane, 2-4-6-2'-4'-6'-hexahydroxy-5-5'-dichlorodiphenylmethane, 2-4-2'-4'-tetrahydroxy-3-5-3'-5'-tetrachlorodiphenylmethane and the corresponding bromo compounds. We have found that there is a synergistic action between the sulfonamides and the diphenylmethane compound used as the essential ingredients in our compositions. The following tests will serve to illustrate potentiation or bacteriostatic synergism against certain gram-positive cocci in vitro.

*Experimental*

A series of in vitro bacteriostatic experiments aureus (bovine). The results set forth in the following table show that non-effective concentrations of 2-2'-dihydroxy-5-5'-dichlorophenylmethane, when combined with non-effective concentrations of sulfanilamide give an effect that is greater than a mere summation of the individual effects of the individual ingredients.

| Antiseptic-added to sterile milk and inoculated with test organisms. Subcultures were made and tested for growth at 1, 24, 48 and 72 hrs. respectively | Subculture growth of *Streptococcus agalactiae* | | | | Subculture growth of *Staphylococcus aureus* | | | |
|---|---|---|---|---|---|---|---|---|
| | 1 | 24 | 48 | 72 | 1 | 24 | 48 | 72 |
| Sulfanilamide, 3.5% | + | + | + | + | + | + | + | + |
| 2-2'-dihydroxy-5-5'-dichlorodiphenylmethane, 0.2% | + | + | + | + | + | + | + | + |
| Sulfanilamide, 3.5%, and 2-2'-dihydroxy-5-5'-dichlorodiphenylmethane, 0.2% | + | ± | − | − | + | ± | − | − |
| Control—no antiseptic | + | + | + | + | + | + | + | + |

+ = growth, ± = limited growth (marked inhibition), − = no growth (complete killing).

It is noted that 3.5% sulfanilamide alone had no apparent bactericidal action in milk against either of the test organisms. Similarly 0.2% 2-2'-dihydroxy-5-5'-dichlorodiphenylmethane alone had no apparent bactericidal action. The mixture of the two substances however was completely bactericidal in 48 hours and had a definite bacteriostatic action in 24 hours.

In order to more clearly illustrate the synergistic action between the sulfonamides and diphenylmethanes, some detailed in vitro experiments employing different mixtures were carried out.

*Experimental.*—When sub-minimal bacteriostatic concentrations of 2-2'-dihydroxy-5-5'-dichlorodiphenylmethane were added to solutions of sulfanilamide in broth, the dilution at which sulfanilamide completely inhibited the streptococci or staphylococci increased approximately 256 times. On the other hand, sub-minimal concentrations of sulfanilamide when added to solutions of 2-2'-dihydroxy-5-5'-dichlorodiphenylmethane in broth increased the dilution at which 2-2'-dihydroxy-5-5'-dichlorodiphenylmethane was completely bacteriostatic approximately eight times.

The following deals with the results obtained in studies carried out to determine whether the diphenylmethane compounds and other sulfonamides were synergic and also which of the compounds in the group possessed the ability to potentiate the bacteriostatic activity of various sulfonamides against *S. mastitidis* and *Staph. aureus* (bovine).

*Procedure.*—The first study entailed the determination of the minimum completely bacteriostatic concentration of each compound. The minimum completely bacteriostatic concentration (M. C. B. C.) is interpreted herein as the smallest concentration of the compound in beef infusion broth (pH 7.6) which completely inhibits growth visible to the unaided eye for a period of 96 hours.

Sterile beef infusion broth (pH 7.6) was used as the solvent for the various compounds as well as the diluent used in making serial dilutions. Broth was prepared in a quantity sufficient to carry out one series of experiments. The test cultures were maintained in this same medium.

Serial dilutions were set up in sterile test tubes in 5 ml. amounts. The concentration decreasing by 50 per cent in each successive tube. Appropriate control tubes were set up for each experiment. Although sterile media and equipment was always used, the tubes containing the various test cultures showed that an inoculum of 0.01 ml. of a $10^{-4}$ dilution of a 24 hour growth usually yielded from 400 to 600 organisms—as determined by plating on beef infusion agar (pH 7.6). Therefore, for each experiment serial dilutions in sterile broth were made and 0.01 ml. of $10^{-4}$ dilution was added to each tube in the series under experiment. Three plates containing sterile beef infusion agar (pH 7.6) were likewise inoculated with 0.01 ml. of $10^{-4}$ dilution of the culture. Counts from the three plates were averaged to determine the number of organisms contained in the inoculum for the experiment. All incubation was carried out at 37° C.

The synergic studies were carried out under the same general plan. Serial dilutions of the one compound were made in sterile broth in such a manner that a constant volume of sub-minimal bacteriostatic concentration of the second compound could be added and give a final dilution of the resulting mixture which decreased by 50 per cent in each succeeding tube. After dilutions were made and before the test culture was added, the tubes were incubated for 24 hours to check on sterility. Control tubes included separate series of dilutions of each compound. Generally three tubes were set up for each compound, giving dilutions 50 per cent higher and 50 per cent lower than the minimum completely bacteriostatic concentration.

*Results.*—The accompanying table shows the results obtained in this study. The products are grouped according to their similarity of chemical structure. Thus it will be seen that P. T. 70, P. T. 80, P. M. 69 and P. M. 68 are similar, differing only in number or type of halogen present on the ring. (P. M. 68 has in addition an alkyl.)

Certain of the sulfonamides were found to be ineffective or not completely bacteriostatic against the test organisms even when these compounds were prepared in a saturated solution in infusion broth (pH 7.6). For example: sulfadiazine was not completely inhibitory against *S. mastitidis*. Neither sulfapyridine or sulfathiazole was inhibitory for staphylococci for the period of the tests (96 hours) and sulfadiazine was only partially inhibitory. However, all of these sulfonamides were rendered bacteriostatically effective in low concentrations by the addition of subminimal bacteriostatic concentrations of the diphenylmethane type compounds.

*Synergic action of certain substituted diphenylmethane derivatives and sulfonamides*

| Compound | M. C. B. C. mgm. per cent Potentiated M. C. B. C. Times dil. increased | | [1] M. C. B. C. in mgm. per cent Potentiated M. C. B. C. in mgm. per cent. Times dilution of sulfonamide increased | | | | | | | | Synergistic action |
|---|---|---|---|---|---|---|---|---|---|---|---|
| | | | Sulfanilamide | | Sulfapyridine | | Sulfathiazole | | Sulfadiazine | | |
| | Str.[2] | Staph.[3] | Str. | Staph. | Str. | Staph. | Str. | Staph. | Str. | Staph. | |
| 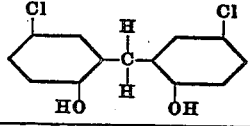 | 0.64 0.08 8 | 0.64 0.08 8 | 64 0.25 256 | 512 2 256 | 50 0.19 256 | >200 | 100 0.79 128 | 200 | >448 1.57 280 | >448 | Yes |
| 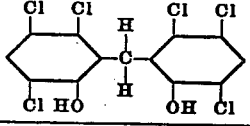 | 0.16 0.08 2 | 0.095 0.004 4 | 64 0.25 256 | 384 1 384 | | | | | | | Yes |
| 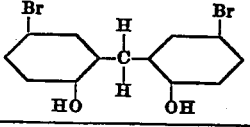 | 0.32 0.16 2 | (4) (4) (4) | 64 0.25 256 | | | | | | | | Yes |
| 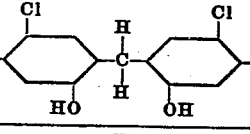 | 0.32 0.16 2 | 0.32 0.16 2 | | | | | 100 0.19 512 | | >448 1.75 256 | | Yes |
| 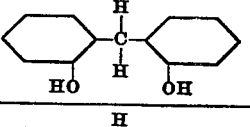 | none | none | | | | | | | | | No |
| 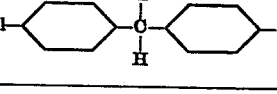 | none | none | | | | | | | | | No |

[1] M. C. B. C.=Minimum complete bacteriostatic concentrations. The smallest concentration of the compound in solution in beef infusion broth (pH 7.6) which will completely inhibit growth visible to the unaided eye for a period of 96 hours at 37° C.
[2] *Streptococcus mastitidis*.
[3] *Staphylococcus aureus* (bovine).
[4] Not tested.

*Discussion.*—It is apparent that the halogen, hydroxy substituted diphenylmethane derivatives when combined with sulfonamides show a marked synergic action against *S. mastitidis* and *Staph. aureus* (bovine). This action appears to be confined to those members of the group which possess at least one hydroxy (OH) and at least one halogen on each ring. The presence of the alkyl in P. M. 68 is probably of no consequence in this respect.

These results have shown that when the hydroxy-halogen diphenylmethane compounds are added in subminimal concentrations to solutions of sulfonamides in broth, the dilutions at which sulfonamides completely inhibit *S. mastitidis* and *Staph. aureus* (bovine) increases from 128 to 512 times. Reversely, the sulfonamides when added in amounts less than their bacteriostatic concentrations to solutions of diphenylmethane type compounds increases the effective dilutions from two to eight times.

One of the significant phases of these experiments lies in the fact that these compounds render several of the sulfonamides as active bacteriostatic agents whereas these sulfonamides by themselves have no bacteriostatic action on the organisms. Thus, as a practical aspect, it might now be possible to use certain sulfonamides as therapeutic meaures in infectious conditions which previously were not effected by these sulfonamides.

As an overall advantage, this synergic action affords the use of sulfonamides in smaller quantities. This would enable a wider choice of sulfonamides in those cases which are sensitive to certain of the sulfonamide compounds. It might also tend to decrease the number of drug reactions since the concentration of the sulfonamide could be maintained at a significantly lower level.

*Conclusions.*—On the basis of in vitro studies, it was found that certain synthetic chemical compounds having the general formula:

in which Y and Y' represent phenyl radicals each having at least one hydroxy substituent and at least one halogen substituent, when combined in subminimal bacteriostatic concentrations with sulfonamides, rendered as complete bacteriostatic agents concentrations of the sulfonamides which by themselves were ineffective.

In order to test the in vivo action of our compositions a representative one comprising 20% 2-2'-dihydroxy - 5 - 5'- dichlorodiphenylmethane and 20% sulfanilamide in mineral oil was injected into the mammary glands of cows infected with mastitis. Five cows were used in the test and the pathogen was eliminated from 2 out of 4 quarters infected with streptococci and from 3 out of 6 quarters with staphylococci, employing a single dose, varying from 20 to 40 cc.

It is obvious that the preceding descriptions are intended to be illustrative only and that we may vary or modify our compositions to a considerable extent without departing from the spirit of the invention or sacrificing the advantage thereof. We do not therefore, intend to limit the invention to the specific embodiments herein set forth except as indicated in the claims.

We claim:

1. A bactericidal composition, having a synergistic effect, containing as the essential active ingredients sulfanilamide and 2-2'-dihydroxy-5-5'-dichlorodiphenylmethane.

2. A bactericidal composition, having a synergistic effect, containing as the essential active ingredients sulfanilamide and 2-2'-dihydroxy-5-5'-dibromodiphenylmethane.

3. A bactericidal composition, having a synergistic effect, containing as the essential active ingredients sulfanilamide and 2-2'-dihydroxy-3-5-6-3'-5'-6'-hexachlorodiphenylmethane.

4. A bacteriostatic composition, having a synergistic effect, containing as the essential active ingredients a substance selected from the group consisting of sulfanilamide and sulfanilamide derivatives having bacteriostatic action and a symmetrically substituted diphenylmethane having the following formula:

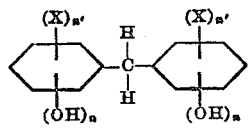

in which X represents a halogen selected from the group consisting of chlorine and bromine, $n$ represents a numeral selected from the group consisting of 1 and 2, $n'$ represents a numeral selected from the group consisting of 1, 2, 3 and 4, and wherein a hydroxy group on each of the benzene rings is in the 2 position and a halogen on each of the benzene rings is in the 5 position.

5. A bactericidal composition, having a synergistic effect, containing as the essential active ingredients a substance selected from the group consisting of sulfanilamide and sulfanilamide derivatives having bacteriostatic action and 2,2'-dihydroxy-5,5'-dichlorodiphenylmethane.

6. A bactericidal composition, having a synergistic effect, containing as the essential active ingredients a substance selected from the group consisting of sulfanilamide and sulfanilamide derivatives having bacteriostatic action and 2,2'-dihydroxy-5,5'-dibromodiphenylmethane.

7. A bactericidal composition, having a synergistic effect, containing as the essential active ingredients a substance selected from the group consisting of sulfanilamide and sulfanilamide derivatives having bacteriostatic action and 2-2'-dihydroxy - 3,5,6 - 3',5',6' - hexachlorodiphenylmethane.

ARTHUR HENRY CRAIGE, Jr.
ALBERT L. KLECKNER.

REFERENCES CITED

The following references are of record in the file of this patent:

UNITED STATES PATENTS

| Number | Name | Date |
| --- | --- | --- |
| 1,707,181 | Weiler et al. | Mar. 26, 1929 |
| 2,250,480 | Gump | July 29, 1941 |

FOREIGN PATENTS

| Number | Country | Date |
| --- | --- | --- |
| 552,751 | Great Britain | Apr. 22, 1943 |

OTHER REFERENCES

Surgery, Gynecology and Obstetrics, Aug. 1944, vol. 79, pages 205–216 by Traube et al.

Amer. J. Pharmacy, July 1943, page 268.